(12) United States Patent
Santiago Fontaina

(10) Patent No.: US 8,766,820 B2
(45) Date of Patent: Jul. 1, 2014

(54) DEVICE FOR LOCATING CRASHED AIRCRAFT

(75) Inventor: José María Santiago Fontaina, Riveira (ES)

(73) Assignee: Save-Dummy, S.L., Riviera, A Coruna (ES)

( * ) Notice: Subject to any disclaimer, the term of this patent is extended or adjusted under 35 U.S.C. 154(b) by 251 days.

(21) Appl. No.: 13/266,220

(22) PCT Filed: Jun. 11, 2010

(86) PCT No.: PCT/ES2010/000259
§ 371 (c)(1),
(2), (4) Date: Jan. 9, 2012

(87) PCT Pub. No.: WO2010/146196
PCT Pub. Date: Dec. 23, 2010

(65) Prior Publication Data
US 2012/0100818 A1 Apr. 26, 2012

(30) Foreign Application Priority Data
Jun. 15, 2009 (ES) .................................. 200901413

(51) Int. Cl.
*G08B 21/00* (2006.01)
(52) U.S. Cl.
USPC ............ 340/945; 340/981; 340/982; 340/953
(58) Field of Classification Search
USPC ............ 340/945, 981, 982, 961, 953; 455/96; 116/200, 202, 209
See application file for complete search history.

(56) References Cited

U.S. PATENT DOCUMENTS

| | | | |
|---|---|---|---|
| 2,959,671 A | 11/1960 | Stevenson | |
| 3,049,091 A | 8/1962 | Carroll et al. | |
| 3,943,445 A * | 3/1976 | Dawson | 455/98 |
| H1560 H * | 7/1996 | Gill et al. | 342/385 |
| 6,260,508 B1 * | 7/2001 | Morse | 116/211 |
| 2006/0148423 A1* | 7/2006 | Sharpe | 455/90.1 |

FOREIGN PATENT DOCUMENTS

FR 1 253 135 2/1961
GB 1 133 254 11/1968

OTHER PUBLICATIONS

International Search Report for International Application No. PCT/ES2010/000259 mailed Oct. 1, 2010.

* cited by examiner

*Primary Examiner* — Toan N Pham
(74) *Attorney, Agent, or Firm* — Merchant & Gould P.C.

(57) ABSTRACT

The present invention consists of a device especially configured for enabling locating an aircraft quickly which due to an accident has fallen in an area where the search for the remains is especially difficult, such as the sea or mountainous areas. It is made up of a container (1) with an automated lock (7) divided internally into two chambers (2 and 3) in which metal sheets (4) and hollow spheres (5) are introduced; an attached beacon (6), a memory circuit (14); and it is operated by means of an automated control. All these elements form an assembly as a result of a protective and waterproof shell (8) joining them together. It also has an anchor (10) joining it to the outer part of the aircraft where it is arranged, which allows automating the release of the device as the result of a signal indicating the imminence of an accident.

7 Claims, 1 Drawing Sheet

DEVICE FOR LOCATING CRASHED AIRCRAFT

This application is a National Stage Application of PCT/ES2010/000259, filed 11 Jun. 2009, which claims benefit of Serial No. 200901413, filed 15 Jun. 2009 in Spain and which applications are incorporated herein by reference. To the extent appropriate, a claim of priority is made to each of the above disclosed applications.

OBJECT OF THE INVENTION

As the title of this document states, the present invention relates to a device configured for enabling locating an aircraft quickly which due to an accident has fallen in an area where the search for the remains is especially difficult, such as the sea or mountainous areas.

More specifically, the proposed device will be made up of an assembly of easily locatable signalling elements which, based on a pre-programming and by means of an operation which if required can be totally independent of the operation of the aircraft carrying it, will clearly determine the position thereof to the search and rescue services.

The device is configured from a hollow container with two inner chambers which will respectively contain metal sheets of little thickness and a small surface; and small hollow rubber spheres coated with reflective paint. Said container will open allowing the contents of the chambers to escape as the result of a signal given. On the other hand, a beacon joined to the container makes locating it exactly easier. Thus, a sequence of several of these devices launched when an excessive drop of the aircraft is detected allows determining the position of the crashed vehicle in a reliable way with a preciseness not known until now in the current state of the art.

FIELD OF THE INVENTION

The main application of the present device will be within the aeronautical industry, more specifically, within the field of aircraft safety.

BACKGROUND

Currently aircraft are one of the safest existing means of transport, establishing a much lower link between serious accidents occurred compared to trips made than with any other type of vehicle. However, the accidents which unfortunately keep happening involve a high cost in human lives and in material elements.

This fact is made worse in the case of accidents occurring in areas of irregular orography, in the open sea and, in general, in areas that are hard to travel to, since in these cases the search for the crashed aircraft becomes exponentially more expensive, a great expense in human means, locating equipment and vehicles being necessary.

In long haul flights or within areas not monitored by radar equipment, the aircraft goes through long periods without providing data about its position, therefore in the event that there is an accident at these times, a ground search for locating the remains, recovering them and investigating the causes for subsequently applying the appropriate solution will be necessary.

Most aircraft have the device known as a "black box" as the only means for making locating it easier in the event of an accident, which among other tasks, is responsible for emitting a radio signal to the outside during the time which its energy stores allow. However, this signal has a limited strength and on occasions covers a very small area compared with the area where it is considered probable that the remains of the aircraft will be found, therefore, the problem of locating is resolved only in a very small part.

The existence of a device which would allow locating the remains of a crashed aircraft quickly is therefore desirable, reducing the rescue costs as well as the necessary time to carry it out.

The device described in the present specification previously incorporated to a crashed aircraft would allow locating the remains quickly, offering great help for this type of situations and without its operation being affected by the climatological conditions or depending on the power supply of the vehicle in which it has been arranged, therefore its operation would not be altered in the event of a general power failure in the aircraft.

No other similar device is known by the proprietor of this present invention which carries out the task of making locating crashed aircraft easier, therefore the novelty of the present invention is considered evident, providing numerous advantages to the aeronautical industry and the industry relating to safety in these vehicles.

SUMMARY OF THE INVENTION

The proposed device is configured from a spindle-shaped container which has two hollow inner chambers. This container furthermore has a beacon and a memory circuit attached thereto, the entire assembly being joined together by means of a shell surface made from a protective and waterproof material, within which there will also be space for a battery supplying energy to the beacon. At one point of the outer surface of the shell an anchoring point will be arranged which will have the capacity to be automatically released as the result of a signal given by a control joined to the unit.

Each of the two inner chambers of the container will be filled with different aircraft locating elements. Thus, in the first of the chambers a specific amount of metal sheets of reduced thickness and surface will be arranged; while in the second chamber small hollow rubber spheres coated with reflective material will be introduced. In addition, each chamber will have an air inlet preferably arranged in the area of greatest exposure to the air during the flight of the craft, such that when the container opens, the air will penetrate the chamber and drive out the contents thereof.

The opening of the container which will contain these locating elements will be such that it will allow the exit of said elements once the command to open has been given, but which would block the passage when the pressure on the outside is greater than the pressure in the chambers. The object of this lock will be to seal the opening of the container in the event of it falling into the water, thus ensuring its buoyancy, therefore any type of lock producing the described effect will be valid for the present device. Due to the same buoyancy reason, it is important to observe the relation between the weight of the device and the volume of the chambers, ensuring the device remains on the surface when falling into the water.

As mentioned above, the locating elements will be of two types:

Metal sheets: of very little weight, little thickness and a small surface. These sheets will be of a striking colour and will be intended for giving more general information about the possible location of the aircraft. Since they float in the air during a specific time which will be in accordance with the existing climatological conditions, it will be possible to spot them from long distances, also being detectable by radar means.

Hollow spheres: these spheres will have a weight such that they will cause them to fall quickly, being scattered in the sea or the terrain which the aircraft was flying over. Thus, a clear indication of the flight direction at the time of the accident is given with an element that will not break nor will it be susceptible to sinking in the water.

The beacon as well as the memory circuit will be joined to the container as a result of an outer shell joining the entire assembly together. This shell will be made from an elastic material and will have considerable thickness such that it cushions the impact of the fall as much as possible once it is released. In an optional embodiment it is possible to incorporate a small parachute element which will reduce the drop speed of the device. Said parachute would be housed in a new compartment located inside the shell surface and would be connected to the control in the same way as the rest of the elements of the device.

An anchor will be arranged at an outer point of the shell which will allow placing each of the devices in a launching base, which will be coupled to the outer part of the aircraft, thus being able to coordinate a launching sequence of several of these devices from the control which allows locating the aircraft to which they have been incorporated quickly.

Each of the devices will be controlled from an automatism connected at several points of each of these devices. This control acts in the event of receiving a pre-programmed warning signal, such that it will initiate the activation process of each device as follows:

In a first step, the shutoff valve of the container will open, releasing the contents to the outside. On one hand, the metal sheets which will float in the air will be released and on the other the hollow spheres, which will fall towards the ground or the water.

In the second step, once the content of the container is released, the beacon will be connected at the same time as the anchor is released, allowing the device to fall. In the optional case of having a small parachute, its compartment will also open releasing it.

The control automatism could be connected with the flight data recorder of the aircraft, such that said data will be processed and consequently transferred to the memory circuit introduced in the device. The most important data of the recorder and which could be key when determining the causes of the accident in the of the event that it is impossible to recover the black box, such as the case of an aircraft accident in very deep maritime areas, is thus safeguarded.

It is important to point out that the present device has an effectiveness which will be directly proportional to the number of them used, the ideal number of these elements to be used should be considered for each case in particular.

The activation signal of the present device will be given from the cockpit of the aircraft as soon as an emergency signal is activated. However, by means of incorporating an altitude gauge and a timer within the control, such that when excessive drops are detected for a specific time interval, a clear indicator of a high probability of a crash, the process for opening and releasing the device or devices will be initiated automatically and regardless of the aircraft electrical system.

DESCRIPTION OF THE DRAWINGS

To complement the description being made and for the purpose of aiding to better understand of the features of the invention, drawings have been attached to the present specification as an integral part thereof with an illustrative and non-limiting character which will be described below.

DESCRIPTION OF THE PREFERRED EMBODIMENT

Figure 1:
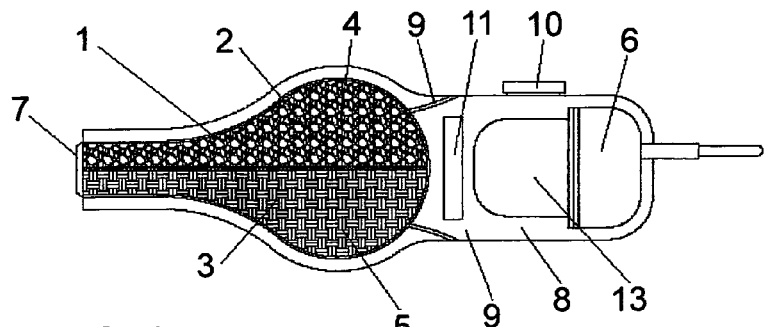
FIG. 1 shows a cross section of the device and a front view.
Figure 2:
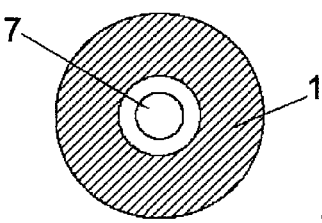
FIG. 2 shows the connection points for connecting the control system to the device.
Figure 2:
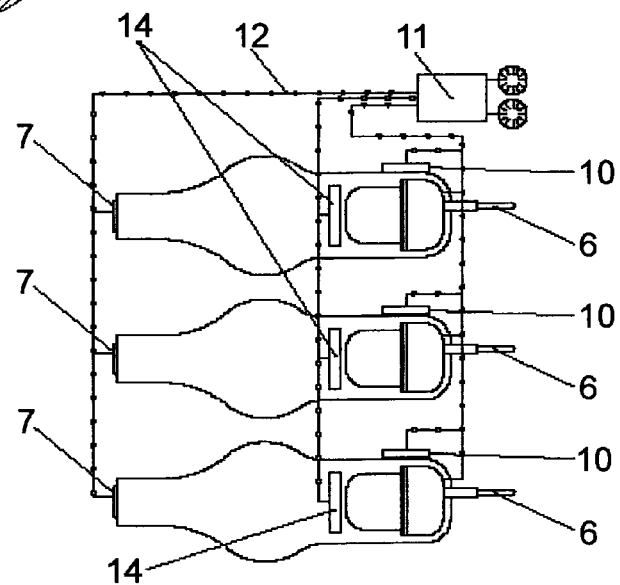
Figure 3:
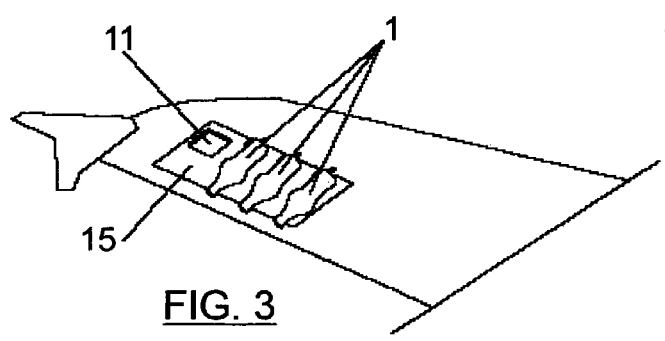
FIG. 3 shows the arrangement of the preferred embodiment in a commercial airplane, more specifically the arrangement in one of the wings.

A preferred embodiment of the device object of the present specification is described below in reference to the installation in a commercial airplane, without limits in terms of its formal constitution or small variants lacking importance in terms of the modification of its main function.

Two identical sets of launching bases for the device are arranged on the respective wings of the commercial airplane, consisting of a small rigid platform, referred to as base (15) which has clamps for the anchors (10) of each of the devices making up the invention. The control system (11) which will coordinate the successive activations, and also electrical wiring (12) to distribute the signals and the operations are arranged on said platform.

Three pairs of devices will be arranged on the two platforms. The control system (11), which has an altitude gauge and timer, will be programmed so that in the event of a drop in altitude greater than two thousand feet in one minute, the first pair of devices will be activated, one in each wing, the sequence being initiated by the outermost pair. The first consequence of the activation will be the opening of the lock (7) of the containers (1), which will allow the circulation of air through the inner chambers (2 and 3) and the through ducts (9) thereto, and the release of the contents of the chambers, i.e., the metal sheets (4) and the hollow spheres (5). After fifteen seconds have passed from the opening of the lock (7) the beacon (6) is switched on and simultaneously, the anchor (10) is released, allowing the device to fall.

As indicated in previous sections of this specification, the control system (11) will be connected to the airplane data recorder, such that said data is processed and conveniently stored in the memory circuit (14), where it will remain stored in foresight of an eventual impossibility of recovering the black box of the airplane.

As can be observed in FIG. 1, the container (1) and the beacon (6) form an assembly as a result of the three-centimeter thick rubber shell (8) which has been arranged. This shell (8) will be waterproof and will have an extension for the antenna of the beacon (6) and its battery (13). The function of the container (1) once it has released its contents will be to ensure the buoyancy of the device once it falls into the water, as a result of the lock returning to its position when it falls into the ocean.

Once it has been detected by the control (11) that the altitude has dropped 10,000 feet in less than 5 minutes, and when an altitude of less than 500 feet has been detected, the remaining two pairs of devices will be released. Thus, during the hours, and even the days following the accident, the clouds of metal sheets (4), which will also be detectable by radar, will be easily located, and it will be possible to spot alignments of reflecting floating spheres (5) in the ocean which will more or less mark the direction of the airplane in its descent. In addition, the radio beacons (6) will be continuously emitting an automated rescue signal upon their activation and remain afloat without the possibility of sinking. All this will enable a lower response time of the rescue teams in the occurred accident, and consequently, an important reduction in rescue costs and a proportional increase of the possibilities of locating victims or survivors.

In alternative embodiments of the present device it will be possible to incorporate variations which will not affect the essential nature of the invention, such as having a compartment for a parachute.

Having sufficiently described the nature of the present invention as well as the manner of putting it into practice, it should be noted that within its essential nature it could be put into practice in other embodiments differing in detail from that indicated by way of example, and which will also be covered by the protection received provided that the fundamental principle thereof is not changed, altered or modified.

The invention claimed is:

1. A device for locating crashed aircraft, comprising a container divided internally into two inner chambers and having an automated lock; an attached beacon, an attached memory circuit; and operated by an automated control system, wherein metal sheets and reflecting hollow spheres are introduced in said inner chambers of the container;
   the container having air inlet ducts which are connected to respective ones of said inner chambers of the container.

2. The device for locating crashed aircraft according to claim 1, wherein the container and the beacon form an assembly including a waterproof shell which keeps them joined together.

3. The device for locating crashed aircraft according to claim 1, furthering comprising an anchor on an outside which is fixed to a base.

4. The device for locating crashed aircraft according to claim 3, wherein the anchor fixed to the base can be automatically released as a result of a signal given by the control system.

5. The device for locating crashed aircraft according to claim 1, wherein the lock is a check valve preventing entry of water.

6. The device for locating crashed aircraft according to claim 1, further comprising a memory circuit connected to the control system.

7. A device for locating crashed aircraft, comprising:
   a container divided internally into two inner chambers and having an automated lock; wherein said inner chambers of the container include metal sheets and reflecting hollow spheres;
   an attached beacon;
   an attached memory circuit; and
   an automated control system operating the device;
   wherein the control system has an altitude gauge and timer, and memory for sequencing activations.

* * * * *